2,951,060
Patented Aug. 30, 1960

2,951,060

PROCESS FOR PREPARING POLYESTERS IN THE PRESENCE OF MANGANOUS CARBOXYLATE CATALYSTS

Harry R. Billica, Greenville, N.C., assignor to E. I. du Pont de Nemours and Company, Wilmington, Del., a corporation of Delaware No Drawing. Filed Mar. 2, 1954, Ser. No. 413,703

12 Claims. (Cl. 260—75)

This invention relates to an improved method for preparing a synthetic linear polyester and, more particularly, to the preparation of filament- and film-forming polyethylene terephthalate.

The production of the novel class of film- and fiber-forming, linear polyesters of terephthalic acid and a glycol of the series $HO(CH_2)_nOH$ where "$n$" is an integer from 2 to 10 inclusive, is fully disclosed in United States Patent No. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxyethyl terephthalate monomer which is polymerized to polyethylene terephthalate under reduced pressure and at elevated temperatures.

An object of this invention is to provide an improved process for preparing a highly polymeric polymethylene terephthalate from a glycol and a lower alkyl ester of terephthalic acid. Another object is to provide a catalyst which is particularly effective in promoting the ester interchange reaction in the preparation of polyethylene terephthalate from glycol and dimethyl terephthalate. Still another object is to provide a catalyst which is soluble in ethylene glycol and which will result in particularly rapid ester interchange between glycol and dimethyl terephthalate, and the production of filament- and film-forming polyethylene terephthalate of low color. These and other objects will more clearly appear hereinafter.

The foregoing objects are realized by the present invention which, briefly stated, comprises carrying out the ester interchange reaction between the glycol, e.g., ethylene glycol, and lower alkyl terephthalate, e.g., dimethyl terephthalate, in the presence of catalytic amounts of a manganese compound from the group consisting of the manganous salts of aliphatic monocarboxylic acids and aliphatic hydroxy monocarboxylic acids, said acids containing not more than six carbon atoms, and thereafter polymerizing the resulting glycol terephthalate, preferably in the presence of an added polymerization catalyst, and a substance operative as a color inhibitor.

The process of the present invention will hereinafter specifically be described with respect to the preparation of bis-2-hydroxy-ethyl terephthalate monomer by an ester interchange reaction between ethylene glycol and dimethyl terephthalate, which process constitutes the preferred embodiment of my invention. The invention, however, is applicable, in general, to the preparation of other monomeric glycol terephthalates by conducting an ester interchange reaction between various other glycols of the series $HO(CH_2)_nOH$, where "$n$" is an integer within the range of 2 to 10 inclusive, and various other alkyl terephthalates, i.e., terephthalate esters of saturated aliphatic monohydric alcohols containing up to and including four carbon atoms, e.g., diethyl, dipropyl and diisobutyl terephthalates. Various specific glycols include trimethylene glycol, tetramethylene glycol, pentamethylene glycol, hexamethylene glycol, heptamethylene glycol, octamethylene glycol, etc. The catalysts of the present invention may also be employed in carrying out ester interchange reactions between mixtures of different esters and at least one polymethylene glycol or polyethylene glycol. For example, a mixture of dimethyl terephthalate, dimethyl sebacate and ethylene glycol may be reacted together to form the mixed esters which, in turn, may be polymerized to form a linear copolyester. Ester interchange reactions of this type are illustrated in copending applications United States Serial Numbers 150,811 and 150,812 filed March 20, 1950, in the name of Mark D. Snyder, now U.S. Patents No. 2,623,033 and 2,623,031, respectively.

Any manganous salt of an aliphatic monocarboxylic acid or aliphatic hydroxy monocarboxylic acid containing not more than six carbon atoms is suitable for the purposes of this invention. As examples of specific compounds, there may be mentioned manganous formate, manganous acetate, manganous hydroxyacetate, manganous propionate, manganous lactate, manganous 3-hydroxybutyrate, manganous valerolactate, manganous pivalate, manganous isocaproate, etc. In place of a single manganous salt, one may employ a mixture of two or more manganous salts from the group specified with like catalytic effect. Manganous salts of aliphatic monocarboxylic acids and hydroxyacids are highly desirable because of their rapid ester exchange rate, low color-producing tendency, and solubility in ethylene glycol and in the reaction mixture at all stages of the polymerization. Solubility of the catalyst at each stage of the process is a particularly important factor in a continuous process for the production of polyethylene terephthalate, since deposits of insoluble materials in the reaction vessels and interconnecting pipes are avoided. On the other hand, many of the inorganic compounds of manganese (such as the oxides, carbonate, nitrate, and sulfate) are low in solubility or are otherwise undesirable because of low ester exchange rate or because they produce color to a high degree during polymerization. Manganous salts of dicarboxylic acids are usually found to be unsatisfactory because of low ester exchange rate, and many of these salts are virtually insoluble in glycol.

In general, the manganese compounds should be used in amounts to provide in the reaction mixture from 0.0001 to 0.0030 of an atom of manganese per mol of lower alkyl terephthalate, e.g., dimethyl terephthalate, present in the initial reaction mixture. Lesser amounts of the catalysts are decreasingly effective in promoting rapid reaction, and larger amounts do not increase the reaction rate proportionately, if at all, and may even give poor color.

The manganous salts of this invention effectively catalyze both the ester exchange reaction and the subsequent polymerization reaction, so that the complete process is conveniently carried out without the addition of further catalytic material. Frequently, however, even better results will be obtained when a secondary catalyst is used in combination with a compound of manganese. Antimony, germanium, and titanium compounds are particularly effective as auxiliary catalysts, especially with reference to the second (or polymerization) stage of the reaction. Often a secondary catalyst is conveniently introduced at the beginning of the process, although it will sometimes be desirable not to add the secondary catalyst until the ester exchange reaction has been completed. The amount of secondary catalyst will vary, depending on the nature of the catalyst and the results desired; but usually a concentration in the range 0.00005 to 0.0030 mol per mol of dimethyl terephthalate will be selected. The catalyst should be soluble in the reaction mixture, at least during the polymerization stage of the reaction.

Examples of specific polymerization catalysts useful herein are: antimony trioxide, triphenyl antimonite, triethyl antimonite, tris(2-hydroxy-ethyl) antimonite, antimonyl potassium tartrate, tetraisopropyl titanate, potassium titanate, lanthanum titanate, and germanium dioxide. Antimony fluoride is an example of an excellent polymerization catalyst which, however, greatly inhibits the ester exchange reaction and should, therefore, be added just prior to the polymerization step.

In preparing fibers or films from polyesters, it is generally desirable to maintain the color of the polymer at the lowest practicable level. Often it is possible to reduce the color of the product by adding a color inhibitor at some stage of the process. Color inhibitors which have been found particularly effective in the present invention include a variety of compounds of phosphorus, such as phosphoric acid, phosphorous acid, phosphoric acid, tributyl phosphate, tributyl phosphite, dibutyl hydrogen phosphate, benzenephosphonic acid, triphenyl phosphate, and tricresyl phosphate. Optimum results are usually obtained in the range 0.05 to 2.0 atoms of phosphorus per atom of manganese. Color inhibitors of this type generally retard the rate of reaction, particularly in the ester exchange reaction. For this reason, the inhibitors are generally not added until the end of the ester exchange reaction.

The following examples will serve to further illustrate the principles and practice of this invention.

EXAMPLE I

This example illustrates the use of various manganese compounds as catalysts in the preparation of polyethylene terephthalate from dimethyl terephthalate (DMT) and ethylene glycol. The results are recorded in Table I. In some instances, an auxiliary catalytic material was added at the beginning of the reaction or after the ester exchange had been completed, but before vacuum was applied for the polymerization step. Two control experiments using litharge (PbO), previously regarded as a preferred catalyst in the preparation of polyethylene terephthalate, are included for comparison.

In each case, the reaction was carried out in the following manner: 50 grams of dimethyl terephthalate and 50 grams of ethylene glycol were placed in a flask together with the amount of catalyst indicated in the table (percentages calculated on the basis of anhydrous compounds). The flask was fitted with a condenser and heated at atmospheric pressure, whereupon the mixture began to evolve methanol in the range 160–190° C., the temperature depending on the catalyst and its concentration. Heating was continued at such a rate that continuous gentle ebullition was maintained until no further methanol was evolved, the final pot temperature being about 220° C. in each case. The liquid was then introduced into a polymerization tube, and in some cases an auxiliary catalyst or a color inhibitor was added. The mixture was heated at 275° C. under a vacuum of 0.5 to 1.0 mm. of mercury for two hours, or for a longer period in some cases. A continuous stream of nitrogen was introduced through a capillary tube to agitate the mixture. At the end of the polymerization period, the color of the molten polymer was compared visually with arbitrary color standards consisting of aqueous solutions of du Pont "Pontamine" Catechu 3 G dye according to the following system of color ratings:

0=water.
1=0.00025 gram of dye per 100 ml. of solution.
2=twice as much dye as 1.
3=three times as much dye as 1.
4=four times as much dye as 1.
5=five times as much dye, and so on.

This system of color standards was designed as a measure of the yellowish to brown range of colors generally encountered in the preparation of polyethylene terephthalate.

The intrinsic viscosity of the resulting polymer, a measure of the degree of polymerization, was determined in dilute solutions of the polymer in Fomal, which comprises 58.8 parts by weight of phenol and 41.2 parts by weight of trichlorophenol.

Table 1

| Catalyst | Wt. Percent (Based on DMT) | Mol Percent (Based on DMT) | Time Required to Complete Evolution of Methanol (Hrs.) | Temperature at Start of Exchange Reaction (° C.) | Catalyst Added After Ester Exchange | Wt. Percent (Based on DMT) | Polymerization Time (Hrs.) | Intrinsic Viscosity of Final Polymer | Product Color |
|---|---|---|---|---|---|---|---|---|---|
| 1. Litharge (PbO) | 0.01 | 0.009 | 2.6 | 190 | | | 2 | 0.37 | 4 |
| | | | | | | | 7 | 0.60 | 7 |
| 2. Litharge | 0.05 | 0.044 | 1.1 | 175 | | | 2 | 0.42 | 15 |
| 3. Manganous Formate | 0.04 | 0.054 | 1.1 | 170 | | | 2 | 0.40 | 3 |
| 4. Manganous Acetate | 0.05 | 0.056 | 1.0 | 168 | | | 2 | 0.43 | 3 |
| 5. Manganous Acetate | 0.067 | 0.075 | 1.3 | 163 | Tetraisopropyl Titanate | 0.01 | 2 | 0.49 | 6 |
| 6. Manganous Acetate / Antimony Trioxide | 0.056 / 0.03 | 0.063 / 0.020 | 1.2 | 168 | | | 2 | 0.58 | 7 |
| 7. Manganous Acetate / Antimony Trioxide | 0.045 / 0.03 | 0.051 / 0.020 | 1.3 | 169 | Phosphoric Acid | 0.033 | 3 | 0.63 | 2 |
| 8. Manganous Hydroxyacetate | 0.05 | 0.047 | 1.0 | 169 | | | 2 | 0.40 | 3 |
| 9. Manganous Propionate | 0.04 | 0.039 | 1.2 | 170 | | | 2 | 0.39 | 3 |
| 10. Manganous Lactate | 0.05 | 0.042 | 1.0 | 168 | | | 2 | 0.37 | 3 |
| 11. Manganous Lactate | 0.09 | 0.075 | 1.3 | 165 | Tetraisopropyl Titanate | 0.01 | 2 | 0.65 | 8 |
| 12. Manganous Sulfate | 0.085 | 0.11 | Slight reaction (4 hrs.). | | | | | | |
| 13. Manganous Oxalate (Insoluble) | 0.11 | 0.15 | Slight reaction (2 hrs.). | | | | | | |

The tabulations show that the use of the manganous salts of this invention is decidedly advantageous with respect to acceleration of the ester exchange reaction as compared with the commercially established procedure utilizing 0.009 mol percent litharge. Higher concentrations of litharge lead to an equivalent exchange rate, but only at a great sacrifice in product color. The preferred manganese compounds are also shown to be equivalent or superior to litharge in the time required to produce polymer of a given intrinsic viscosity. The product colors obtained with these manganese compounds as catalysts are comparable to and frequently better than those obtained with 0.009 mol percent litharge. As shown in the table, however, certain manganous salts are ineffective as ester exchange catalysts.

The following example, which deals with constant temperature ester exchange, further demonstrates the utility of manganese compounds in the ester exchange reaction.

EXAMPLE II

The reaction chamber for a constant temperature ester exchange apparatus consisted of a stainless steel beaker, 2⅞" in diameter and 2¼" deep, fitted with a stainless steel cover clamped down with wing nuts and sealed with a gasket prepared from a sheet of polytetrafluoroethylene. The outside of the beaker was electroplated with copper, wound with resistance wire, and insulated. The cover was provided with openings for two thermocouple wells, an inlet tube for a stream of nitrogen gas, and a joint connecting to a column for removal of the methanol. The temperature in the reactor was controlled by a thermocouple acting through a pyrometer controller, and the temperature was checked constantly with another thermocouple connected to a potentiometer. The methanol was removed through an electrically heated column equipped with a rotating strip of stainless steel gauze twisted spirally about a vertical shaft; features of this column included good separating efficiency, high throughput rate, and low holdup. The jacket temperature was maintained slightly below the boiling point of methanol (65° C.). After passing through the column, the methanol was condensed and collected.

In each run shown in Table II, a charge of 75 grams of dimethyl terephthalate and 65 cc. of glycol was heated to 175° C., whereupon a preheated slurry of the indicated amount of catalyst in 10 additional cc. of glycol was introduced. The temperature of the mixture was maintained at 175°±2.5° C. throughout the run, and a continuous stream of nitrogen gas was maintained to aid removal of the methanol. The reaction mixture was stirred slowly by a magnetic stirrer in a stainless steel case. The volume of methanol collected after 30, 60, and 90 minutes was recorded, and the percentages based on the theoretical yield of methanol are shown in the table.

*Table II*

| Catalyst | Mol Percent (Based on DMT) | Methanol Recovered (percent of theoretical) | | |
|---|---|---|---|---|
| | | 30 min. | 60 min. | 90 min. |
| 1. Lead Oxide | 0.009 | 15 | 26 | 40 |
| 2. Lead Oxide | 0.044 | 39 | 72 | |
| 3. Lead Oxide | 0.35 | 91 | 97 | 99 |
| 4. Manganous Formate | 0.040 | 68 | 86 | 93 |
| 5. Manganous Acetate | 0.045 | 76 | 89 | 94 |
| 6. Manganous Acetate | 0.062 | 84 | 93 | 96 |
| Antimony Trioxide | 0.02 | | | |

The results of Example II show that the ester exchange reaction can be carried through quickly and substantially to completion under constant temperature conditions by the catalytic effect of manganous salts in relatively low concentrations. A fast ester exchange rate under constant temperature conditions is of particular importance for a catalyst to be used in a continuous process for the production of polyethylene terephthalate. Litharge at a concentration of 0.009 mol percent, previously regarded as satisfactory, is a much slower ester exchange catalyst under constant temperature conditions; while the higher concentration of litharge necessary for an acceptable ester exchange rate leads to very high color in the final product.

Since both ester exchange time and polymerization time are influenced by the equipment and the size of the batch being prepared, the following examples are included to show the utility of manganese compounds in preparing large batches of polyethylene terephthalate.

EXAMPLE III

The following ingredients were introduced into a stainless steel batch still equipped with a stirrer and a condenser:

Dimethyl terephthalate, 58 lbs.
Ethylene glycol, 40 lbs.
Manganous acetate·2½ H₂O, 0.0396 lb. (0.062 mol percent based on DMT).
Antimony trioxide, 0.0232 lb. (0.027 mol percent based on DMT).

The ester exchange started at about 160° C. and 2.8 hours were required to remove the methanol formed. The resulting material, principally bis-2-hydroxy-ethyl terephthalate, was transferred to a 50-lb. stainless steel autoclave equipped with a stainless steel stirrer and heated to about 275° C.

The autoclave was evacuated gradually through an ice trap and a Dry Ice trap; and when the pressure in the autoclave was reduced to about 0.5 mm. of mercury, the polymerization was carried out for 2.9 hours at this full vacuum. The intrinsic viscosity of the resulting polymer as measured in Fomal was 0.65, and the polymer was of medium light color.

EXAMPLE IV

The procedure of Example III was repeated except that the catalyst employed was 0.0058 lb. of litharge (0.009 mol percent based on DMT). The ester exchange reaction began at 170° C. and required 4.5 hours for complete removal of methanol. The subsequent polymerization required 9.3 hours at full vacuum to obtain polyethylene terephthalate having an intrinsic viscosity of 0.66. The polymer was of medium light color, about the same as that of the polymer of the previous example.

While dimethyl terephthalate and ethylene glycol are the preferred monomers, and the present invention has been described hitherto with particular reference to these starting materials, the manganese compounds herein, as stated hereinabove, also effectively catalyze the ester exchange and polymerization reactions of other glycols with other terephthalate esters. The following example illustrates the polymerization of trimethylene glycol with dimethyl terephthalate.

EXAMPLE V

The following ingredients were heated in a three-liter flask:

Dimethyl terephthalate, 1215 grams.
Trimethylene glycol, 1000 grams.
Methyl o-benzoylbenzoate, 7.52 grams.
Manganese acetate·2½H₂O, 0.55 gram. (0.040 mol percent based on DMT.)
Antimony trioxide, 0.365 gram. (0.020 mol percent based on DMT.)

The ester exchange reaction started at 178° C., and 4.7 hours were required to remove 406 grams of distillate, predominantly methanol. One hundred grams of the residual liquid were transferred to a polymerization tube, and the pressure was reduced to 1 mm. of mercury. The tube was heated at 282° C. for 90 minutes at this full vacuum. During this time, a constant stream of nitrogen gas was introduced through a capillary tube into the reaction mixture. The resulting polymer was amber in color, and the intrinsic viscosity, as measured in Fomal, was 0.42.

I claim:

1. In the process for manufacturing filament- and film-forming polymethylene terephthalate wherein a glycol of the formula, $HO(CH_2)_nOH$, where "$n$" is an integer from 2 to 10 inclusive, is reacted with an alkyl ester of terephthalic acid having from 1 to 4 carbon atoms in the alkyl group under conditions to effect ester interchange, and the resulting glycol terephthalate is thereafter polymerized under conditions to form polymethylene terephthalate, the improvement which comprises carrying out the ester interchange in the presence of a catalyst from the group consisting of the manganous salts of aliphatic monocarboxylic acids and aliphatic hydroxy monocarboxylic acids, said acids containing not more than six carbon atoms.

2. The process of claim 1 wherein the polymerization is also carried out in the presence of said catalyst.

3. In the process for manufacturing filament- and fiber-forming polyethylene terephthalate wherein glycol is reacted with dimethyl terephthalate under conditions to effect ester interchange and the resulting bis-2-hydroxy-ethyl terephthalate is thereafter polymerized under conditions to form polyethylene terephthalate, the improvement which comprises carrying out the ester interchange in the presence of a catalyst from the group consisting of the manganous salts of aliphatic monocarboxylic acids and aliphatic hydroxy monocarboxylic acids, said acids containing not more than six carbon atoms.

4. The process of claim 3 wherein the polymerization is also carried out in the presence of said catalyst.

5. The process which comprises reacting glycol and dimethyl terephthalate under conditions to effect ester interchange and in the presence of a catalyst from the group consisting of the manganous salts of aliphatic monocarboxylic acids and aliphatic hydroxy monocarboxylic acids, said acids containing not more than six carbon atoms, whereby to form bis-2-hydroxy-ethyl terephthalate.

6. The process of claim 5 wherein said catalyst is manganous formate.

7. The process of claim 5 wherein said catalyst is manganous acetate.

8. The process of claim 5 wherein said catalyst is manganous hydroxyacetate.

9. The process of claim 5 wherein said catalyst is manganous propionate.

10. The process of claim 5 wherein said catalyst is manganous lactate.

11. In a process of making highly polymeric polyethylene terephthalate wherein glycol is reacted with dimethyl terephthalate in the presence of an ester interchange catalyst to effect ester interchange, the improvement which comprises using manganous acetate as the ester interchange catalyst.

12. In a process of making highly polymeric polyethylene terepthalate wherein glycol is reacted with dimethyl terephthalate in the presence of an ester interchange catalyst to effect ester interchange, the improvement which comprises using manganous formate as the ester interchange catalyst.

References Cited in the file of this patent

UNITED STATES PATENTS

| | | |
|---|---|---|
| 2,402,486 | Adelson et al. | June 18, 1946 |
| 2,578,660 | Auspos | Dec. 18, 1951 |